(12) United States Patent
Soekawan

(10) Patent No.: US 11,869,064 B1
(45) Date of Patent: Jan. 9, 2024

(54) SYSTEM AND METHOD OF IDENTIFYING APPROPRIATELY SIZED ATTIRE

(71) Applicant: Hobin Soekawan, Jakarta (ID)

(72) Inventor: Hobin Soekawan, Jakarta (ID)

( * ) Notice: Subject to any disclaimer, the term of this patent is extended or adjusted under 35 U.S.C. 154(b) by 0 days.

(21) Appl. No.: 18/168,561

(22) Filed: Feb. 13, 2023

(51) Int. Cl.
| | |
|---|---|
| *G06Q 30/00* | (2023.01) |
| *G06Q 30/0601* | (2023.01) |
| *G06T 7/62* | (2017.01) |
| *G01S 17/89* | (2020.01) |
| *G06T 17/00* | (2006.01) |
| *A43D 1/02* | (2006.01) |

(52) U.S. Cl.
CPC ......... *G06Q 30/0631* (2013.01); *A43D 1/025* (2013.01); *G01S 17/89* (2013.01); *G06Q 30/0629* (2013.01); *G06T 7/62* (2017.01); *G06T 17/00* (2013.01)

(58) Field of Classification Search
None
See application file for complete search history.

(56) References Cited

U.S. PATENT DOCUMENTS

| | | | | |
|---|---|---|---|---|
| 5,128,880 | A * | 7/1992 | White | A43D 1/025 600/592 |
| 9,460,557 | B1 * | 10/2016 | Tran | G06T 15/205 |
| 10,149,637 | B2 * | 12/2018 | Latterman | A61B 5/1072 |
| 11,238,188 | B2 | 2/2022 | Sargent | |
| 2002/0023288 | A1 * | 2/2002 | Garneau | A41B 11/001 2/239 |
| 2006/0212157 | A1 | 9/2006 | Watanabe | |
| 2015/0302597 | A1 | 10/2015 | Bentson | |
| 2017/0245570 | A1 | 8/2017 | Yuen | |
| 2017/0272728 | A1 * | 9/2017 | Rafii | G06Q 30/0631 |
| 2018/0300791 | A1 * | 10/2018 | Ganesan | G06Q 30/0601 |

FOREIGN PATENT DOCUMENTS

| | | |
|---|---|---|
| CN | 112488780 A | 3/2021 |
| WO | 2020201507 A | 10/2020 |

OTHER PUBLICATIONS

Sven Molkenstruck et al. "3D Body Scanning in a Mirror Cabinet", DAGM 2008, LNCS 5096, pp. 284-293, 2008. © Springer-Verlag Berlin Heidelberg 2008. (Year: 2008).*
"Anatomy of the Foot and Ankle", https://orthopaedia.com/page/Anatomy-of-the-Foot-and-Ankle.

* cited by examiner

*Primary Examiner* — Naeem U Haq
(74) *Attorney, Agent, or Firm* — KOS IP Law LLP

(57) ABSTRACT

A properly sized article of clothing, such as footwear, can be identified by performing a 3D scan of a corresponding portion of a user's body and comparing the size, shape, and external volume of the corresponding portion of the user's body with known sizes, shapes, and internal volumes of articles of clothing offered by a retailer. This process can increase the ability of retailers to match consumers with properly fitting articles of clothing, such as footwear. Additionally, the proper size, and best fitting styles of footwear can be recommended to the user from a variety of offerings provided by the retailer. 3D scanning the user's body allows both retailers and customers to account for subtle size differences that exist in various clothing products and allow consumers to be matched with the best fitting clothing without the need to purchase or return multiple items.

17 Claims, 6 Drawing Sheets

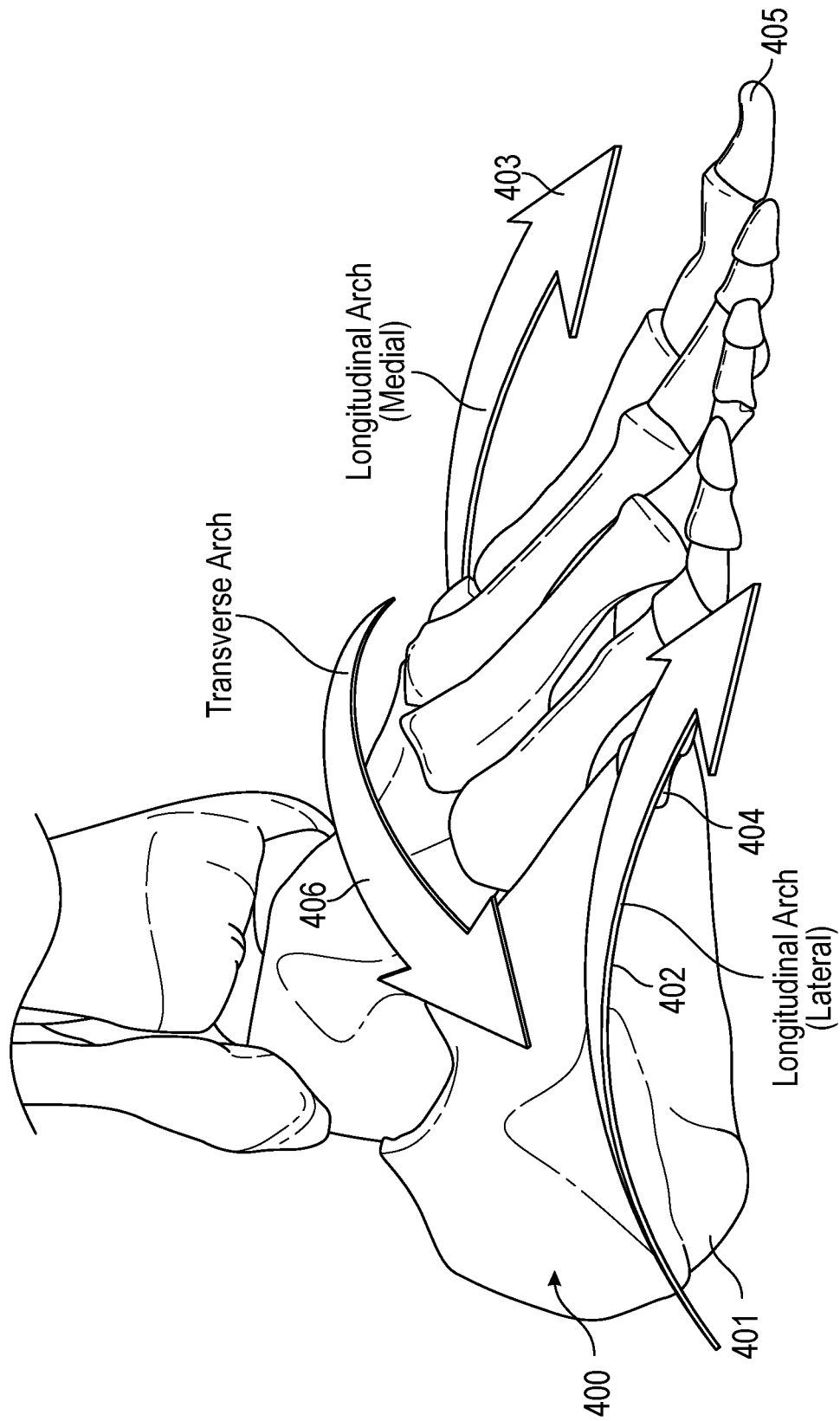

SYSTEM AND METHOD OF IDENTIFYING APPROPRIATELY SIZED ATTIRE

CROSS-REFERENCE TO RELATED APPLICATIONS

Not applicable.

FIELD

The present disclosure relates to identifying appropriately sized attire and, more particularly, to a system and method of identifying appropriately sized footwear.

BACKGROUND

The size of clothing or attire, such as footwear, is an indication of the fitting size of the item to a person. There are various different footwear or shoe sizing systems used around the world. While footwear size systems may employ a number to indicate the length of the shoe, various sizing systems may differ in exactly what they measure, what unit of measurement they employ, and where the size (e.g., a size from 0-20) is displayed on the item of footwear. Some systems may also indicate shoe width, such as a width indicated using a number or letter. However, variations both within and between sizing systems can make identifying appropriately sized footwear difficult for consumers.

SUMMARY

A comfortable and appropriately sized article of footwear for a user can be identified by generating a 3-dimensional (3D) model of a user's foot and comparing the volume of the user's foot with the volume of an interior space of numerous articles of footwear. By comparing the volume of the user's foot with the volume of the footwear, the best fitting footwear can be identified on an individual basis. For example, a particular retailer having various full, and half size footwear items can provide a better customer experience by allowing users to identify the size of footwear having the best fit for each customer. This process allows both retailers and customers to account for subtle size differences that exist in various footwear products. Additionally, this process allows customers to be matched with footwear that both fits appropriately and is also comfortable to wear by avoiding purchasing footwear that might press on pressure points, or unique anatomical features of each customer's particular foot shape.

Provided in accordance with aspects of the present disclosure is a system for identifying an appropriately sized article of footwear including a 3D scanner configured to scan a foot of a user and generate a 3D model of the user's foot. A computer is in communication with the 3D scanner. The computer includes a processor and a memory. The memory stores computer instructions configured to instruct the processor to analyze the 3D model of the user's foot to determine an exterior shape of the user's foot and a volume of the user's foot. The processor is instructed by the computer instructions to receive an internal shape of an interior space of an article of footwear and a volume of the interior space of the article of footwear. The processor is instructed by the computer instructions to compare the exterior shape of the user's foot and the volume of the user's foot with the internal shape of the interior space of the article of footwear and the volume of the interior space of the article of footwear. The processor is instructed by the computer instructions to determine a degree of size match between the user's foot and the article of footwear based on the comparison between the exterior shape of the user's foot and the volume of the user's foot and the internal shape of the interior space of the article of footwear and the volume of the interior space of the article of footwear. The processor is instructed by the computer instructions to identify a particular article of footwear of numerous articles of footwear having a greatest degree of size match with the user's foot. The particular article of footwear defines a particular footwear size. The processor is instructed by the computer instructions to recommend the particular article of footwear defining the particular footwear size to the user.

In an aspect of the present disclosure, the system includes a contour fitting sock configured to be worn on user's foot. The contour fitting sock includes a set of reference marks. The reference marks are configured to stay equally spaced apart from each other when the contour fitting sock is in a first arrangement in which the contour fitting sock is separated from the user's foot and when the contour fitting sock is in a second arrangement in which the contour fitting sock is worn on user's foot. The contour fitting sock includes numerous measurement marks arranged about the contour fitting sock. The measurement marks are configured to move apart from each other as the contour fitting sock stretches when the contour fitting sock is worn on the foot of the user. The 3D scanner is configured to generate the 3D model of the user's foot by scanning the set of reference marks and the measurement marks.

In an aspect of the present disclosure, the 3D scanner includes a light detection and ranging (LIDAR) scanner.

In an aspect of the present disclosure, the 3D scanner includes at least one scanner included in smartphone or a tablet computer. The 3D scanner of the smartphone or tablet computer may employ at least one camera of the smartphone or tablet computer.

In an aspect of the present disclosure, the processor is instructed by the computer instructions to recommend a particular style of footwear and a corresponding size of the particular style of footwear based on the degree of size match between the user's foot and the identified article of footwear.

In an aspect of the present disclosure, the processor is instructed by the computer instructions to identify a transverse cross-section across a horizontal midplane of an ankle of the user's foot in the 3D model of the user's foot. The processor is instructed by the computer instructions to determine the first volume of the user's foot within a 3D space extending from the transverse cross-section of the user's ankle to a distal end of the user's foot.

In an aspect of the present disclosure, the processor is instructed by the computer instructions to identify a partial volume within the total volume of the user's foot. The partial volume corresponds with a predetermined region of the user's foot. The processor is instructed by the computer instructions to receive another partial volume within the total volume of the interior space of the article of footwear. The partial volume of the article of footwear is in a region of the interior space of the article of footwear corresponding with the predetermined region of the user's foot. The processor is instructed by the computer instructions to compare the partial volume of the user's foot with the partial volume of the interior space of the article of footwear.

In an aspect of the present disclosure, the predetermined region of the user's foot includes a heel of the user's foot, an arch of the user's foot, a lateral longitudinal arch of the user's foot, a medial longitudinal arch of the user's foot, a base of a little toe of the user's foot, a base of a big toe of the user's foot, a lateral side of the little toe of the user's foot, a lateral side of the big toe of the user's foot, an upper surface adjacent the lateral side of the little toe of the user's foot, and upper surface adjacent the big toe of the user's foot, a transverse arch of the user's foot, or an upper portion of the user's foot.

Provided in accordance with aspects of the present disclosure, a system for identifying an appropriately sized article of clothing includes a 3-dimensional (3D) scanner configured to scan an anatomical region of a user and generate a 3D model of the anatomical region of the user. A computer is in communication with the 3D scanner. The computer includes a processor and a memory. The memory stores computer instructions configured to instruct the processor to analyze the 3D model of the anatomical region of the user to determine an exterior shape of the anatomical region of the user and a volume of the anatomical region of the user. The processor is instructed by the computer instructions to receive an internal shape of an interior space of an article of clothing and a volume of the interior space of the article of clothing configured to fit the anatomical region of the user. The processor is instructed by the computer instructions to compare the exterior shape of the anatomical region of the user and the volume of the anatomical region of the user with the internal shape of the interior space of the article of clothing and the volume of the interior space of the article of clothing. The processor is instructed by the computer instructions to determine a degree of size match between the anatomical region of the user and the article of clothing based on the comparison of the exterior shape of the anatomical region of the user and the volume of the anatomical region of the user with the internal shape of the interior space of the article of clothing and the volume of the interior space of the article of clothing. The processor is instructed by the computer instructions to identify a particular article of clothing having the greatest degree of size match with the anatomical region of the user. The particular article of clothing defines a particular clothing size. The processor is instructed by the computer instructions to recommend the particular article of clothing defining the particular clothing size to the user.

In an aspect of the present disclosure, the system includes a contour fitting garment configured to be worn on the anatomical region of the user. The contour fitting garment includes a set of reference marks configured to stay equally spaced apart from each other when the contour fitting garment is in a first arrangement in which the contour fitting garment is separated from the anatomical region of the user and when the contour fitting garment is in a second arrangement in which the contour fitting garment is worn on the anatomical region of the user. The contour fitting garment numerous measurement marks configured to move apart from each other as the contour fitting garment stretches when the contour fitting garment is worn on the anatomical region of the user. The 3D scanner is configured to generate the 3D model of the anatomical region of the user by scanning the set of reference marks and the measurement marks.

In an aspect of the present disclosure, the processor is instructed by the computer instructions to recommend a particular style of clothing and a corresponding size of the particular style of clothing based on the degree of size match between the anatomical region of the user and the identified article of clothing.

In an aspect of the present disclosure, the processor is instructed by the computer instructions to identify a partial volume within the volume of the anatomical region of the user. The partial volume corresponds with a predetermined region of the anatomical region of the user. The processor is instructed by the computer instructions to receive another partial volume within the volume of the interior space of the article of clothing. The partial volume is in a region of the interior space of the article of clothing corresponding with the predetermined region of the anatomical region of the user. The processor is instructed by the computer instructions to partial volume within the volume of the interior space of the article of clothing to determine a degree of volume match between the partial volume and the volume of the interior space of the article of clothing.

Provided in accordance with aspects of the present disclosure is a computer-implemented method of identifying an appropriately sized article of footwear including receiving a 3-dimensional (3D) model of a user's foot. The method includes analyzing the 3D model of the user's foot to determine an exterior shape of the user's foot and the volume of the user's foot. The method includes receiving an internal shape of an interior space of an article of footwear and a volume of the interior space of the article of footwear. The method includes comparing the exterior shape of the user's foot and the volume of the user's foot with the internal shape of the interior space of the article of footwear and the volume of the interior space of the article of footwear. The method includes determining a degree of size match between the user's foot and the article of footwear of numerous articles of footwear base on the comparison of the exterior shape of the user's foot and the volume of the user's foot with the internal shape of the interior space of the article of footwear and the volume of the interior space of the article of footwear. The method includes identifying a particular article of footwear having the greatest degree of size match with the user's foot. The particular article of footwear defines a particular footwear size and the method includes recommending the particular article of footwear defining the particular footwear size to the user.

In an aspect of the present disclosure, the computer-implemented method includes scanning the user's foot to generate the 3D model of the user's foot. Scanning the user's foot includes scanning a set of reference marks of a contour fitting sock worn on the user's foot. The reference marks are configured to stay equally spaced apart from each other when the contour fitting sock is in a first arrangement in which the contour fitting sock is separated from the user's foot and when the contour fitting sock is in a second arrangement in which the contour fitting sock is worn on the user's foot. The method includes scanning measurement marks of the contour fitting sock. The measurement marks are configured to move apart from each other as the contour fitting sock stretches when the contour fitting sock is worn on the user's foot. The method includes generating the 3D model of the user's foot based on the scanned reference marks and the scanned measurement marks.

BRIEF DESCRIPTION OF THE DRAWINGS

Various aspects and features of the present disclosure are described hereinbelow with reference to the drawings wherein:

FIG. 4 is an anatomical diagram of an exemplary foot;

DETAILED DESCRIPTION

Figure 1:
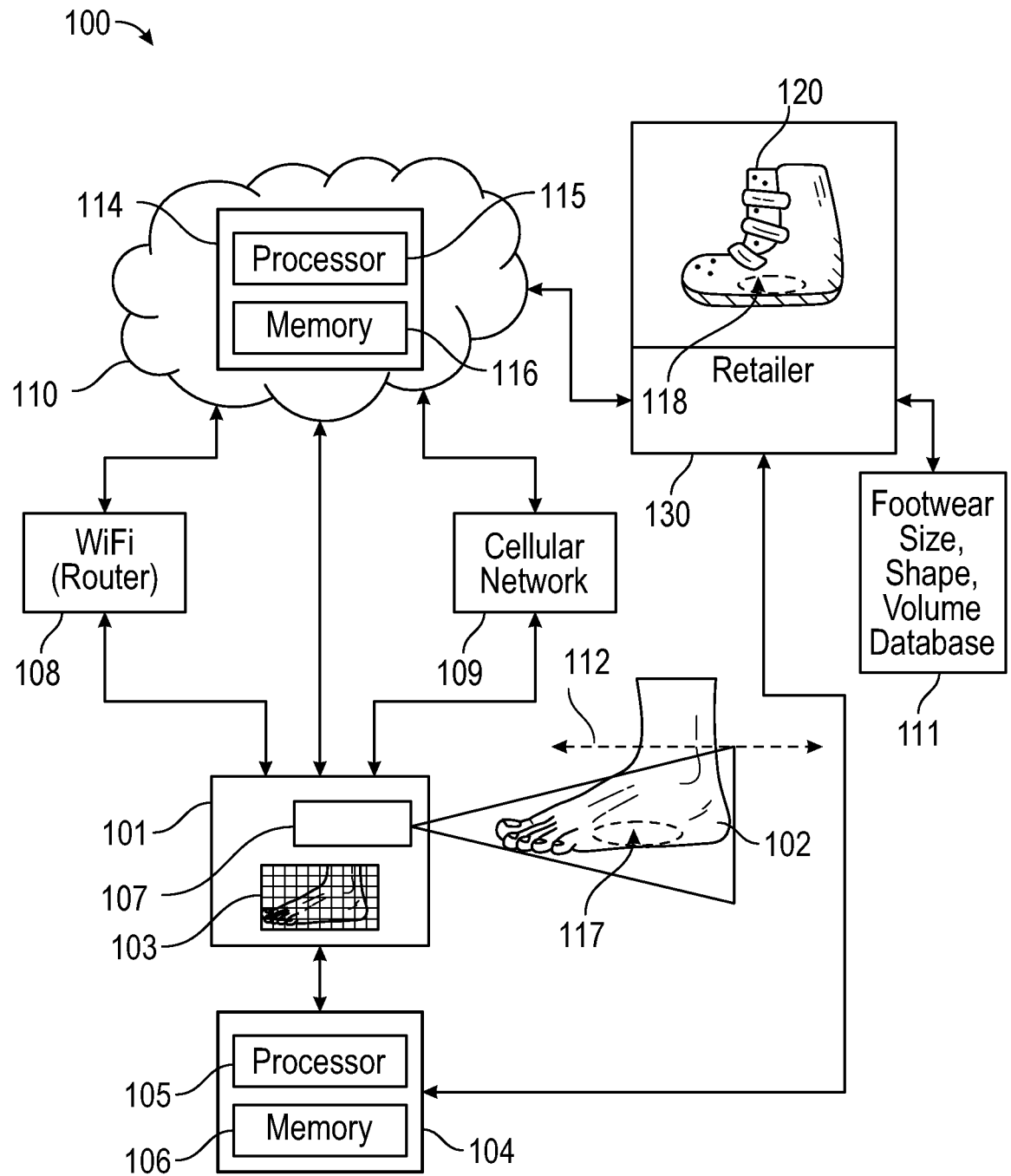
FIG. 1 is a schematic diagram of a system for identifying appropriately sized attire according to aspects of the present disclosure.

The system 100 and method 200 of the present disclosure allows consumers and retailers to identify the best size and fit for various attire; particularly, for footwear items, such as shoes, boots, socks, and athletic footwear. For example, a user's foot 102 can be scanned using a 3D scanner 101 to generate a 3D model 103 of the user's foot. The shape, size, and exterior volume of the user's foot 102 can be identified by using the 3D model 103. By comparing the exterior volume of a user's foot 102 with the interior volume of various articles of footwear, a particular item of footwear (see, e.g., footwear 120) having the best size fit and/or the highest level of comfort can be identified. A user's foot 102 is scanned to generate the 3D model 103 of the user's foot 102. The shape, size, and volume of the individual user's foot 102 can then be compared with a database 111 storing the shape, size, and volume of various sized articles of footwear carried by the retailer 130 to identify the best fitting footwear item for a particular user. Therefore, the best fitting and most comfortable footwear can be identified.

Figure 5A:
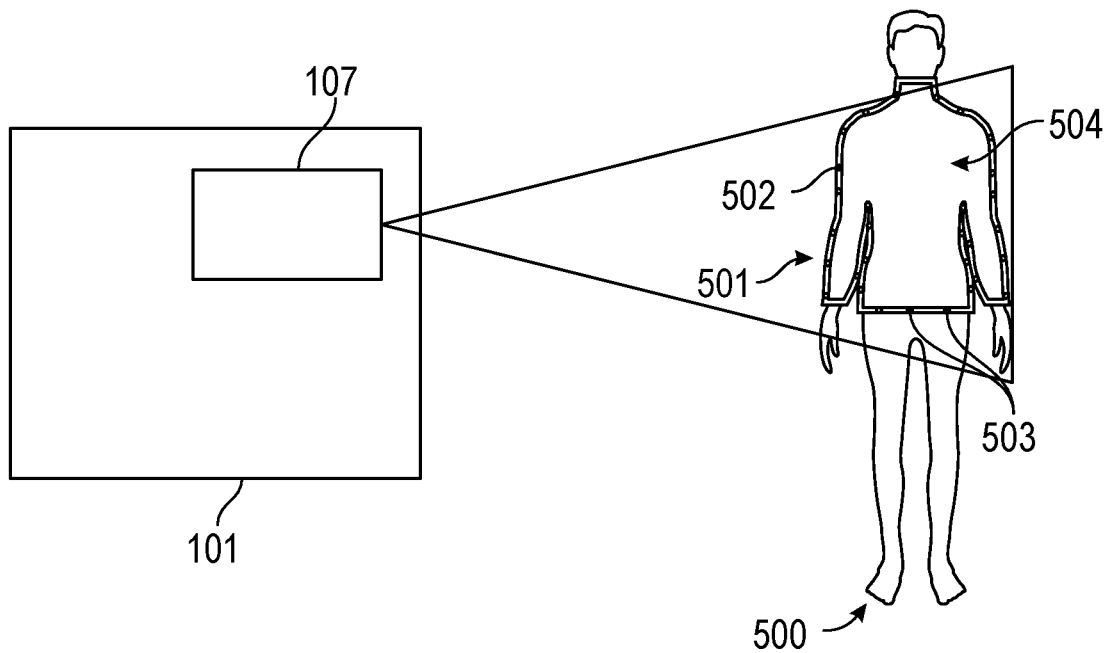
FIG. 5A is a schematic diagram of the system of FIG. 1 employing a contour fitting garment for identifying an article of clothing for a user's upper body.
Figure 5B:
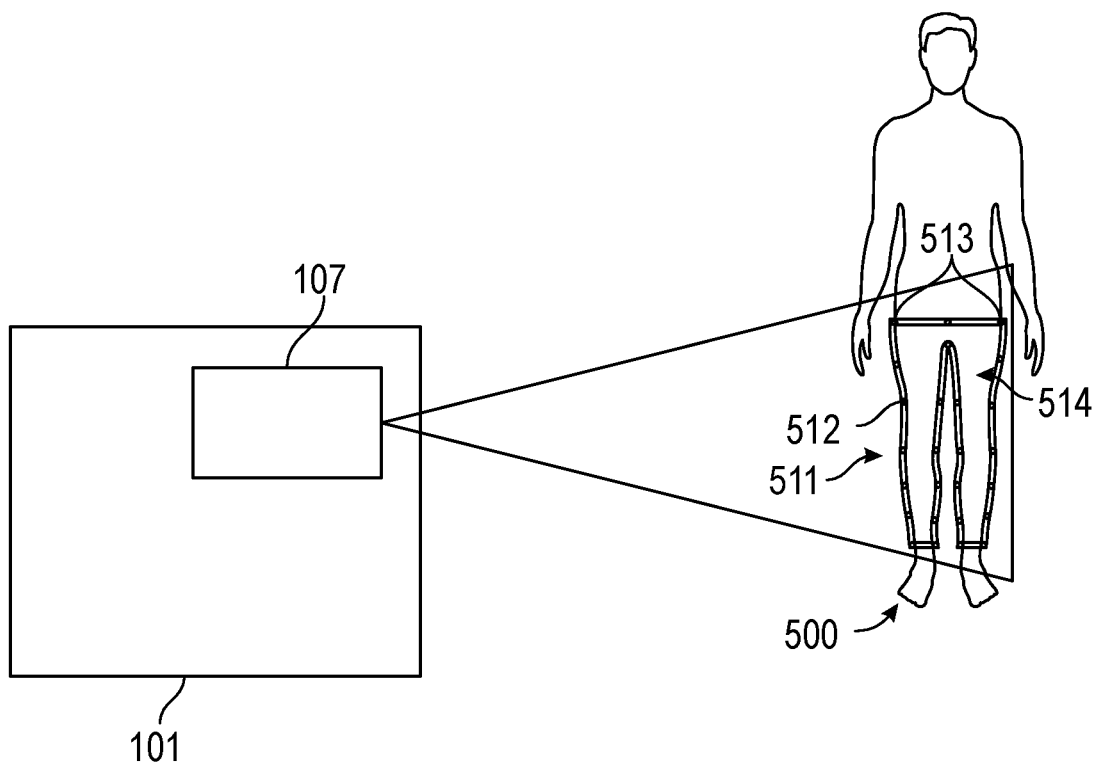
FIG. 5B is a schematic diagram of the system of FIG. 1 employing a contour fitting garment for identifying an article of clothing for a user's lower body.

The process of scanning the user's body, such as the user's foot 102, can be assisted by employing a contour or form fitting garment (see, e.g., contour fitting garments 501 and 511 in FIGS. 5A and 5B, respectively), such as a form fitting sock (see, e.g., contour fitting sock 301 in FIG. 3) with numerous marks 302 or sensors that can be identified by the 3D scanner 101. Employing the contour fitting sock 301 can further increase the accuracy of the scan and generate a higher quality 3D model 103 of the user's foot 102. The form fitting garment or sock may have plurality of cross hatched lines that are spaced apart from each other. After wearing the form fitting garment or sock, pictures of the body part may be taken with a known object with known size. The shape, size, and/or volume of the body part can then the determined.

Aspects of the present disclosure include fitting an article of clothing (e.g., long sleeve shirt, short sleeve shirt, shorts, long pants, and shoes) to a person based on a scanned anatomical region or body part of a user. The scanned body part can be used to derive the external shape, size, and volume of the body part. The manufacturer of the article of clothing will know the internal shape, size and volume of the article of clothing. As an example, the retailer may access a database 111 storing the internal shape, size and volume of each article of clothing or footwear that the retailer carries. With this information, the system and method according to aspects of the present disclosure can determine which size and type of article of clothing will fit the user's body part best.

When the user is on a retailer's website, the user can upload a 3D model of the user's body part. As an example, the user can perform 3D scanning of their body on their own, or the user can get their body part scanned by asking someone to come to their home, place of business, or other agreed upon location. Alternatively, the user can get their body part scanned utilizing a tightly fitting article of clothing (e.g., contour fitting sock 301) with sensors, marks (e.g., marks 302), or dots that can be recognized by the 3D scanner 101. The tightly fitting article used for scanning may be sent by the retailer to the consumer.

The user can also select a style of the article of clothing (e.g., shoe) that the user wants to buy. The retailer's website processes the 3D scan of the user's body part and lets the user know whether the style of article of clothing (e.g., shoe) would fit the person and suggest a size of the article of clothing. The retailer's website makes the suggestions of style and/or size based on the external shape, size and volume of the user's body part according to the generated 3D model of the user's body part and the manufacturer's known internal size, shape and volume of articles of clothing, footwear, or any form of athletic equipment.

One aspect of the present disclosure is that the matching is done by correlating the external shape, size and volume of the scanned body part to the internal shape, size and volume of the article of clothing provided by the manufacturer of the article of clothing.

Another aspect of the present disclosure is the use of a scanner, such as a scanner employing a smartphone camera (or another digital camera) and a tightly fitting article of clothing with numerous sensor, dots, marks, or other lines that are recognized by the scanner.

Referring particularly to FIG. 1, a system 100 for identifying an appropriately sized article of footwear (e.g., footwear 120) includes a 3D scanner 101 configured to scan a foot 102 of a user and generate a 3D model 103 of the user's foot 102. A computer 104 is in communication (e.g., through a wired or wireless connection) with the 3D scanner 101. The computer 104 includes a processor 105 and a memory 106. The computer 104 may be embodied in a smartphone, tablet computer, or desktop computer. The scanner 101 and computer 104 may be separate hardware devices. Alternatively, the scanner 101 and computer 104 may be embodied in a single device, such as a smartphone, tablet computer, or desktop computer. The process of scanning the user's body part may employ the onboard hardware 107 of the smartphone, tablet computer, or desktop computer. For example, a digital camera, digital camera array, or light detection and ranging (LIDAR) scanner of the smartphone, tablet computer, or desktop computer may be employed to scan a user's body part.

As an example, the onboard hardware 107 of the smartphone, tablet computer, or desktop computer may include one or more of numerous lens types utilized for digital photograph, such as a wide-angle lens, a telephoto lens, a macro lens, or an ultra-wide-angle lens, or any other lens embodied in the smartphone, tablet computer, or desktop computer.

The system 100 can connect the scanner 101 and/or computer 104 with product information provided by a retailer 130 through a WiFi connection 108 or a cellular network connection 109. Alternatively, the scanner 101 and/or computer 104 can communicate with the retailer 130 via a direct wired or wireless connection. The scanner 100 and/or computer 104 can communicate with the retailer 130 via the cloud-based system employing a cloud-based remote computer server 114. The cloud-based remote computer server 114 may include a processor 115 and a memory 116.

A more detailed exemplary structure of the computer 104 is described below with reference to FIG. 6, in which computer 600 is described. The structure of the computer 600 may similarly be employed by the cloud-based server 114.

The memory 106 of computer 104 stores computer instructions configured to instruct the processor 105 to perform a computer-implemented method of identifying an appropriately sized article of footwear 200. Similarly, the processor 115 and memory 116 of the cloud-based remote computer server 114 may execute the computer instructions, and the scanner 101 and/or computer 104 may receive data from the cloud-based remote computer server 114 may through a user interface (e.g., a smartphone application) running on the scanner 101 and/or computer 104. That is, a smartphone application may transmit and receive data from the cloud, and the computer-implemented method(s) described herein may be performed remotely with respect to a smartphone or tablet computer running the smartphone application.

Figure 2:
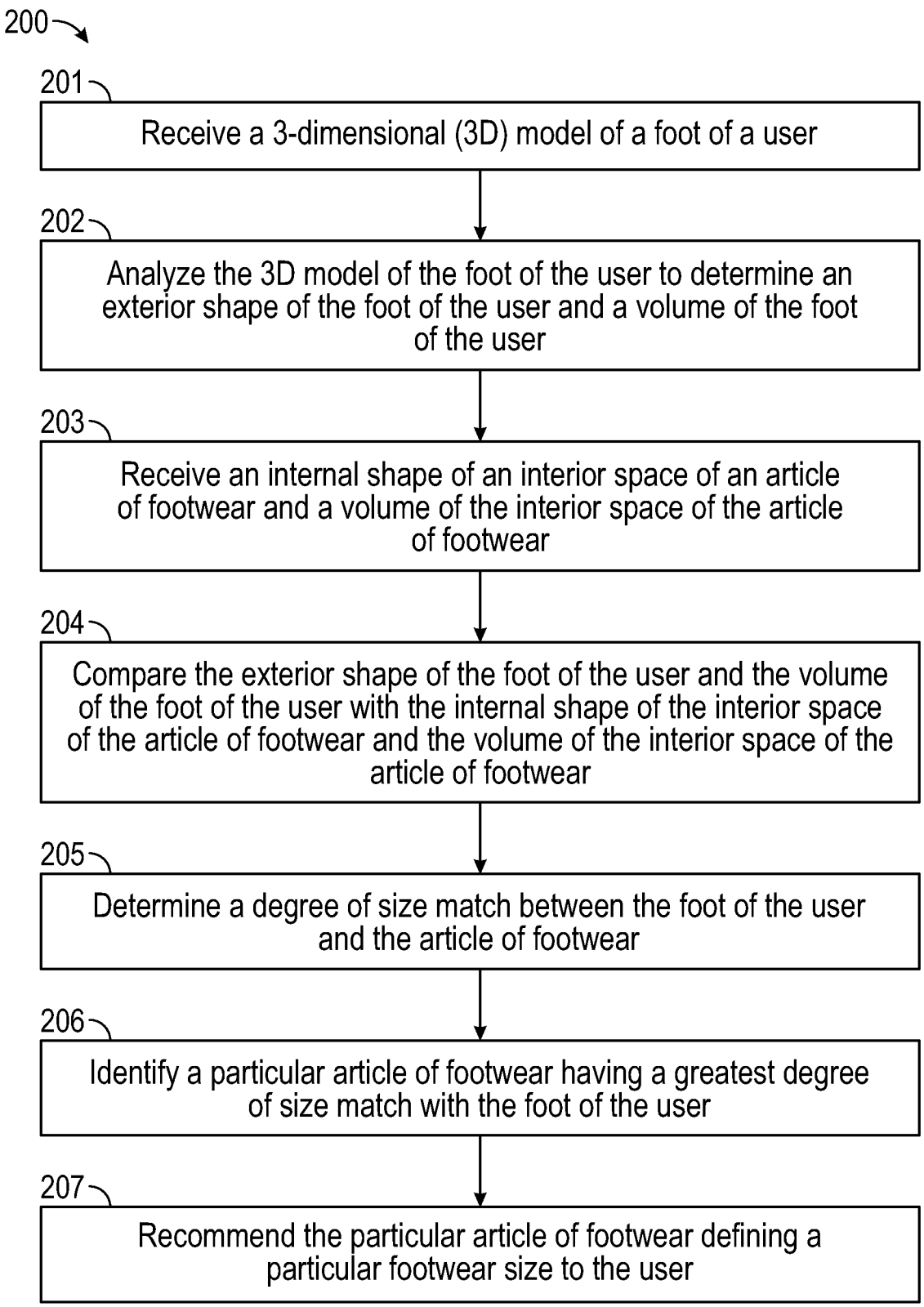
FIG. 2 is a flow chart illustrating a method of identifying appropriately sized attire according to aspects of the present disclosure.

Referring to FIG. 2, the computer-implemented method of identifying an appropriately sized article of footwear 200 includes receiving a 3-dimensional (3D) model of a user's foot 201. The method 200 includes analyzing the 3D model of the user's foot to determine an exterior shape of the user's foot and a volume of the user's foot 202. The method 200 includes receiving an internal shape of an interior space of an article of footwear and a volume of the interior space of the article of footwear 203. The method 200 includes comparing the exterior shape of the user's foot and the volume of the user's foot with the internal shape of the interior space of the article of footwear and the volume of the interior space of the article of footwear 204. The method 200 includes determining a degree of size match between the user's foot and the article of footwear of numerous articles of footwear based on the comparison of the exterior shape of the user's foot and the volume of the user's foot with the internal shape of the interior space of the article of footwear and the volume of the interior space of the article of footwear 205. The method 200 includes identifying a particular article of footwear having a greatest degree of size match with the user's foot 206. As an example, the degree of size match may be determined on a scale of 0 to 100, in which a score of 100 represents a greatest possible degree of match between the user's foot 102 and the particular article of footwear. The particular article of footwear defines a particular footwear size and the method 200 includes recommending the particular article of footwear defining the particular footwear size to the user 207. As an example, it may be determined that a size 10 running shoe is the best fitting article of footwear for the user, and the user may receive a recommendation to purchase size 10 running shoes.

The volume of a user's foot 102 may refer to the 3-dimensional space occupied within the irregular boundaries of the exterior boundary of the user's foot 102. Volume can be measured in terms of cubic inches.

When identifying the best size match between the user's foot 102 and a particular item of footwear, it may be desirable to allow for at least some excess volume between the volume of the user's foot 102 and the volume of a particular item of footwear. For example, it may be desirable to select footwear that has a volume at least slightly larger than the volume of the user's foot to avoid excess pressure on the user's foot 102. The difference between the volume of the user's foot 102 and the volume of the footwear may be set at a predetermined percentage or at a predetermined set amount. For example, it may be desirable to select footwear having a volume that is from about 0.25% to about 15% larger than a volume of a user's foot, such as, for example, 8% larger. Alternatively, an absolute amount may be employed instead of a percentage. For example, the difference between the volume of the user's foot 102 and the volume of the footwear may be set at a specific number of cubic inches. More particularly, it may be desirable to select footwear having a volume that is from about 1 cubic inches to about 10 cubic inches larger than a volume of a user's foot, such as, for example, 3 cubic inches larger.

By way of example and not limitation, the best size match may be where an inner volume of the footwear is 3 cubic inches or greater than an exterior volume of the person's foot. The footwear comes in standard sizes such as size 6, 6.5, 7, 7.5, 8, 8.5, 9, 9.5. The footwear may come in all standard sizes that are currently available in the market or that may be developed in the future. Nevertheless, the footwear matched to the person is a standard sized footwear. Because the footwear is a standard size footwear, the inner volume of the footwear may not be exactly 3 cubic inches or the optimal amount of inches greater than the exterior volume of the person's foot. As such, it is contemplated that the best size match between the person's foot and the footwear is determined as being the next size up or the next size down. For example, if a size 8 footwear has an inner volume which is 2.5 cubic inches greater than the person's foot and a size 8.5 footwear has an inner volume which is 3.5 inches greater than the person's foot, it is contemplated that the best size match of the footwear may be the size 8.5 footwear. It is also contemplated that the best size match may be dependent upon the number of returns from customers. For example, if the best size match was initially set as being the next size up above the optimal amount of cubic inches but that had a greater number of returns from customers compared to a best size match that is set as being the next size down below the optimal amount of cubic inches, then the best size match would be the one with less returns. Various volume differences between the footwear and the person's foot can be initially set and test in in an A-B test in order to determine which is the one with the lowest customer returns. The one with the lowest customer returns would be the optimal volume difference for a best size match between the user's foot and the footwear.

The A-B test can also be based upon footwear brands and also product lines within footwear brands. For example, the optimal volume difference may not treat footwear brands all the same. More particularly, a size 8 for Adidas may be slightly different than a size 8 for Nike. The computer model would account for such differences. As such, the A-B testing in order to determine the optimal volume difference would be within a particular brand. The A-B test would not preferably before a size 8 Adidas shoe and a size 8 Nike shoe. Rather, the A-B test would be for a size 8 Adidas shoe and a size 8.5 Adidas shoe. Moreover, the A-B test may be for a particular product category within a particular brand. For example, a size 8 Adidas running shoe would fit differently than a size 8 Adidas walking shoe. As such, the A-B test may be for a particular product category and would not cross these product categories. The A-B test may also be for a particular product line such as a size 9 Air Jordan 13 and a size 9 Air Jordan 14.

With reference particularly to FIGS. 1 and 2, the exterior shape and volume of the user's foot 102 may be determined with respect to a number of predetermined reference points or planes of the user's foot 102. The predetermined reference planes can be identified within the 3D model 103 of the user's foot 102 to define the metes and bounds within which size, shape, and/or volume of the user's foot is determined. Any reference planes may be utilized, including a cross sectional plane, a curved plane, or any individual arranged at any area of the user's foot, ankle, or leg (e.g., within the 3D model 103). By way of example and not limitation, the predetermined reference plane may be a plane between the hind foot and the mid foot so that the volume of the foot may include only the midfoot and the forefoot. When comparing the volume of the foot to the volume of the footwear, a plane on the footwear may be identified which corresponds with the plane between the hind foot and the mid foot.

As an example, the predetermined reference plane may include a first reference plane (e.g., a boundary plane) below the user's ankle that represents the uppermost portion of various articles of footwear, a second reference planealigned with the heel of the user's foot, and a third reference plane at the distal-most end of the user's foot.

As another example, the exterior shape and volume of the user's foot 102 may be determined from a transverse cross-section 112 across a midline of an ankle of the user's foot 102 to a distal-most end of the user's foot 102. In this example, the predetermined reference planes employed may include the transverse cross-section 112, the heel of the user's foot, and the distal-most end of the user's foot 102. The distal-most end of the user's foot 102 may vary based on anatomical differences of the user's foot 102. For example, the distal-most end of the user's foot 102 may be the distal-end of the user's big toe (see, e.g., FIG. 4 and the corresponding description below for a more detailed description of foot anatomy). The shape, size, and/or volume calculation(s) can be determined within the generated 3D model 103 of the user's foot 102.

As an example, a machine learning algorithm, such as a convolutional neural network (CNN), and more particularly a 3D CNN, can be employed to identify the size, external shape, and volume of the user's foot from the 3D model 103 of the user's foot 102. The machine learning algorithm or model may also be employed to determine a degree of size match between the user's body part and numerous articles of clothing or footwear to identifying and recommend the best fitting clothing or footwear or style of clothing footwear from a variety of offerings from a particular retailer.

While a CNN may be employed, as described herein, other classifiers or machine learning models may similarly be employed. The machine learning model may be trained on tagged data, such as previously generated data sets including foot or other body part size, shape, and volume determined using 3D models of the foot or other body part. The trained CNN, trained machine learning model, or other form of decision or classification processes can be used to implement one or more of the methods, functions, processes, algorithms, or operations described herein. A neural network or deep learning model can be characterized in the form of a data structure storing data representing a set of layers containing nodes, and connections between nodes in different layers are formed or created that operate on an input to provide a decision or value as an output (e.g., shape, size, volume of a user's body part or to determine a degree of size match between an article of clothing/footwear and a user's foot or other body part, as described herein).

Machine learning can be employed to enable the analysis of data and assist in making decisions. To benefit from using machine learning, a machine learning algorithm is applied to a set of training data and labels to generate a "model" which represents what the application of the algorithm has "learned" from the training data. Each element (e.g., one or more parameters, variables, characteristics, or "features") of the set of training data is associated with a label or annotation that defines how the element should be classified by the trained model. A machine learning model predicts a defined outcome based on a set of features of an observation. The machine learning model is built by being trained on a dataset which includes features and known outcomes. There are various types of machine learning algorithms, including linear models, support vector machines (SVM), Bayesian networks, neural tree networks, random forest, and/or XGBoost. A machine learning model may include a set of layers of connected neurons that operate to decide (e.g., a classification) regarding a sample of input data. When trained (e.g., the weights connecting neurons have converged and become stable or within an acceptable amount of variation), the model will operate on new input data (e.g., on a new 3D model of a user's body part) to generate the correct label, classification, weight, or score as an output. Specifically, shape, size, volume, or a degree of size match can be output, as described herein. Other suitable machine learning models not specifically described herein may be similarly employed.

As an example, the degree of size match between the user's foot 102 sand the article of footwear (e.g., footwear 120) of numerous articles of footwear is determined by generating a score between 0 and 100 (this may be referred to as a "size match score"), in which a score of 100 indicates a perfect size match and 0 indicates a complete mismatch. Data of the size, shape, and volume of various articles of footwear (or other clothing items) may be accessed from database 111 by retailer 130. While a scale of 0-100 is described, any other comparative scale may be employed, such as a score of 0-1,000 or any other variation allowing for a comparison of size, shape and volume.

The size match score may be an average of three or more other scores ranging from 0 to 100. For example, a first score between 0 and 100 may be generated by comparing the shape of the user's foot 102 with various articles of clothing to generate the first score between 0 and 100 based on the shape of the user's foot. A linear size, such as a size measured from the heel of the user's foot 102 to the distal-most part of the user's foot 102 may be compared to the internal linear size of the various articles of clothing available from a retailer to generate a second score between 0 and 100. A third score between 0 and 100 for the volume of the user's foot may be generated by comparing the external volume of the user's foot with the internal volume of the various articles of clothing available from the retailer. Thus, the size match score may be an average of the first score, the second score, and the third score. Additional scores between 0 and 100 may also be incorporated into the size match score.

A fourth score between 0 and 100 may be determined by comparing the width of the user's foot 102 with widths of the various articles of footwear. The width of the user's foot 102 may be measured at a central region between the heel of the user's foot and the distal-most point of the user's foot (e.g., the end of the user's big toe—see, e.g., FIG. 4 for a more detailed description of foot anatomy).

A particular style of footwear or clothing and a corresponding size of the particular style of footwear or clothing may be determined based on the degree of size match between the user's foot and the identified article of footwear. That is, a particular style of footwear (e.g., running sneakers, or dress boots) may be identified as fitting a particular user very well at a particular size, and recommended to the user.

Referring particularly to FIG. 1, areas of the foot known to be difficult to match with proper fitting footwear may be evaluated. This evaluation may be performed by selecting partial volumes of the user's foot 102 within the 3D model 103 of the user's foot 102 that are less than the overall volume of the user's foot 102. Any portion of the overall volume of the user's foot 102 may be selected within the 3D model 103. Areas of partial volumes may be selected using pre-selected shapes, such as 3D shapes (e.g., a sphere, ovoid, cube, cuboid, cone, cylinder, pyramid, or any irregular shape). The shape applied to defining a partial volume may be an irregular shape that is defined to a user within the 3D model to pinpoint a common point of foot discomfort for the user.

The partial volume of the user's foot may be from a transverse vertical cross-sectional plane at a highest point of an arch of the user's foot to a curved vertical cross-sectional plane at the web of the users toes. This partial volume of the user's foot may be compared to a corresponding volume in the footwear.

As an example, the volume of a user's foot specifically in the regions of the arch, the heel, or adjacent the little toe or big toe may be evaluated to compare the volumes of those regions with the corresponding internal volumes of those regions in various articles of footwear available from a retailer. As an example, a partial volume 117 within the total volume of the user's foot may be determined. The partial volume 117 corresponds with a predetermined region of the user's foot 102. Another partial volume 118 within the total volume of the interior space of the article of footwear is also received (e.g., from database 111). The partial volume 118 of the article of footwear is in a region of the interior space of the article of footwear corresponding with the predetermined region of the user's foot 102. The partial volume 117 of the user's foot is compared with the partial volume 118 of the interior space of the article of footwear to identify a best possible match accounting for areas of the foot known to be difficult to find a good fit for.

As another example, the widest part of a person's foot is often the outer base of the big toe to the outer base of the pinky or little toe. A vertical cross-sectional plane may be drawn across the widest part of the user's foot 102 (e.g., within the 3D model 103) between the base of the big toe and the base of the little toe. A partial volume may be defined from a certain distance distal to a certain distance proximal of the cross-sectional plane. For example, the partial volume may be defined from about 0.1 inches to about 2 inches distal of the cross-sectional plane to about 0.1 inches to about 2 inches proximal of the cross-sectional plane. This partial volume can be compared with a corresponding partial volume of an article of footwear to determine if there is an adequate amount of volume in the article of footwear to fit the widest part of the user's foot 102.

The cross-sectional plane drawn across the widest part of the user's foot 102 can be compared with a corresponding cross-sectional plane of an article of footwear to determine if the article of footwear will fit the portion of the user's foot 102 corresponding with the cross-sectional plane by comparing the area of the user's foot 102 defined by the cross-sectional plane with the corresponding area of the article of footwear.

Cross-sectional planes can be drawn at any portion of the 3D model and compared with corresponding cross-sectional planes of various articles of footwear to compare the two-dimensional area defined by the cross-sectional planes with the corresponding two-dimensional area of the article of footwear.

Figure 3:
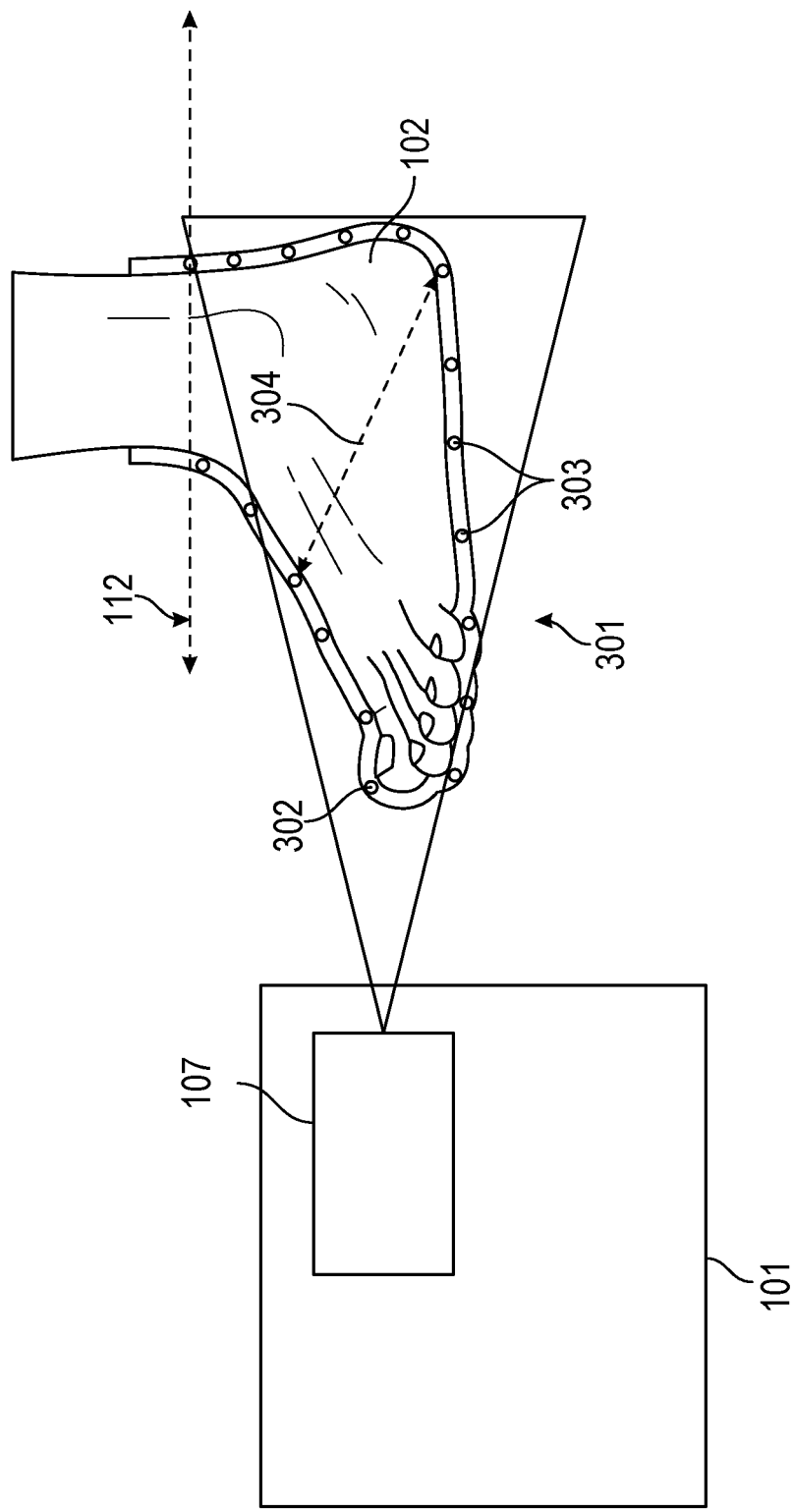
FIG. 3 is a schematic diagram of the system of FIG. 1 employing a contour fitting sock for identifying appropriately sized attire.

Referring particularly to FIGS. 1 and 3, a contour fitting sock 301 configured to be worn on the user's foot 102 may be employed by scanner 101 to generate the 3D image 103 of the user's foot 102. The contour fitting sock 301 includes numerous measurement marks 302 arranged about the contour fitting sock 301. The measurement marks 302 are configured to move apart from each other as the contour fitting sock 301 stretches when the contour fitting sock 301 is worn on the foot 102 of the user (see, e.g., dashed line 304 in FIG. 3 showing spacing apart between a corresponding pair of measurement marks 302). The measurement marks 302 may include physical marks, such as marks formed of ink or decals on a surface of the contour fitting sock 301. The measurement marks 302 may be in the form of circle, spheres, or lines; however, any shape measurement mark recognizable by the scanner 101 may be employed, and a combination of various marks of various shapes and sizes may be employed. The measurement marks 302 may also include physical structures, such as discs or spheres that are embedded in the contour fitting sock 301. As an example, the measurement marks 302 may be reflective, magnetic, electromagnetic, light-emitting, light-absorbing, acoustically reflective, or acoustically absorbing. An object of known size, such as a quarter, can be arranged adjacent the user's foot 102 to provide scale for the scanner 101.

The contour fitting sock 301 includes a set of reference marks 303. Unless otherwise indicated below, the reference marks 303 are substantially the same as the measurement marks 302 described herein. The reference marks 303 are configured to stay equally spaced apart from each other when the contour fitting sock 301 is in a first arrangement in which the contour fitting sock 30 is not worn on the user's foot 102 and when the contour fitting sock 301 is in a second arrangement in which the contour fitting sock 301 is worn on user's foot 102. The 3D scanner 101 is configured to generate the 3D model 103 of the user's foot by scanning the set of reference marks 302 and the measurement marks 303.

As an example, a set of reference marks 303 includes two reference marks. However, other combinations of reference marks 303 in different shapes may be employed, such as three reference marks 303 arranged in a triangular configuration, four reference marks 303 arranged in a square or rectangular configuration, five reference marks 303 arranged in a pentagonal configuration, six reference marks 303 arranged in a hexagonal configuration, or other combinations of additional reference marks 303, provided the reference marks 303 are configured to not move apart from each other when the contour fitting sock 301 (or the contour fitting garment 501 or 511 described below with reference to FIGS. 5A and 5B) is worn by the user.

Referring particularly to FIG. 4, various regions of a user's foot 400 may be measured for size, shape, and volume. For example, as described herein, a partial volume of a particular or predetermined region of a user's foot 400 may be determined and compared with a corresponding region of an article of footwear. As an example, the predetermined region of the user's foot 400 includes a heel 401 of the user's foot 400, an arch of the user's foot 400 (e.g., a lateral longitudinal arch 402 of the user's foot 400 or a medial longitudinal arch 403 of the user's foot 400), a base of a little toe 404 of the user's foot 400, a base of a big toe 405 of the user's foot 400, a lateral side of the little toe 404 of the user's foot 400, a lateral side of the big toe 405 of the user's foot 400, an upper surface adjacent the lateral side of the little toe 404 of the user's foot 400, and an upper surface adjacent the big toe 405 of the user's foot 400, a transverse arch 406 of the user's foot 400, or an upper portion of the user's foot 400.

Referring to FIGS. 1, 2, 5A, and 5B, the scanning system 100 and process 200 described herein can be employed for any other part of a user's body 500, such as the upper body 504 or lower body 514 of the user's body 500. As described above with reference to scanning the foot 102 of the user, the 3D scanner 101 can be employed to scan the user's body 500 with or without the use of contour fitting garments 501 or 511.

The contour fitting garment 501 employed for scanning the upper body 504 of user's body 500 includes numerous measurement marks 502 and at least one set of reference marks 503. Similarly, the contour fitting garment 511 employed for scanning the lower body 514 of user's body 500 includes numerous measurement marks 512 and at least one set of reference marks 513. The measurement marks 502/512 and reference marks 503/513 are substantially the same as the measurement marks 302 and the reference marks 303 described above with reference to FIG. 3.

Figure 6:
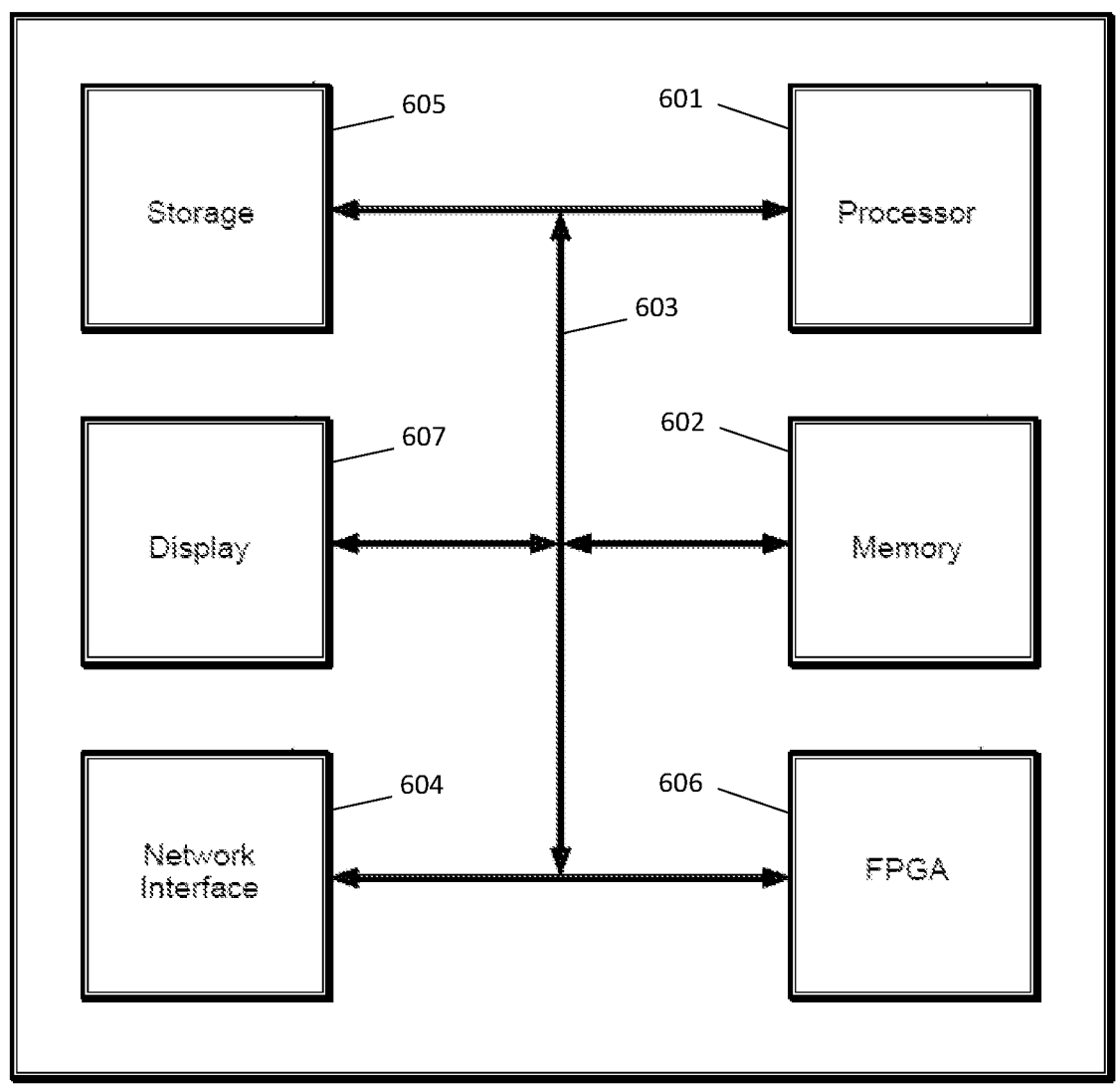
FIG. 6 is a block diagram of an exemplary computer employable to execute the methods and algorithms described herein according to aspects of the present disclosure.

Referring to FIG. 6, a general-purpose computer 600 is described. The general-purpose computer 600 can be employed to perform the various functions described herein. The computer 600 may include a processor 601 connected to a computer-readable storage medium or a memory 602 which may be a volatile type memory, e.g., RAM, or a non-volatile type memory, e.g., flash media, disk media, etc. The processor 601 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 602 can be random access memory, read-only memory, magnetic disk memory, solid state memory, optical disc memory, and/or another type of memory. The memory 602 can communicate with the processor 601 through communication buses 603 of a circuit board and/or through communication cables such as serial ATA cables or other types of cables. The memory 602 includes computer-readable instructions that are executable by the processor 601 to operate the computer 600 to execute the various functions described herein. The computer 600 may include a network interface 604 to communicate (e.g., through a wired or wireless connection) with other computers or a server. A storage device 605 may be used for storing data. The computer 600 may include one or more FPGAs 606. The FPGAs 606 may be used for executing various functions described herein. A display 607 may be employed to display data processed by the computer 600.

Exemplary configurations of the disclosure are described herein (e.g., with reference to the accompanying drawings). Like reference numerals may refer to like elements throughout the specification and drawings.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

While shape, size, and volume are described with respect to various embodiments herein, it should be understood that size, shape and/or volume of a user's foot or body part and/or the size, shape and/or volume of any article of clothing or footwear can be independently determined and compared. That is, one of the size, shape, volume, or partial volumes for a user's body may be individually identified and compared with a corresponding size, shape, volume, or partial volume of an article of clothing or footwear, or any combination of the above may be identified and compared. For example, linear size and overall volume of a user's foot may be compared with a corresponding linear size and overall volume of an item of footwear to determine a size match.

It should be noted that the system and method described herein can be employed to match a user with commercially available articles of clothing and footwear. For example, the system and method allow a user to find the best fitting size of footwear from a particular retailer from a commercially available lineup of sizes (e.g., size 1-15, which half sizes also available) without the need to have custom sized footwear created.

The above description is given by way of example, and not limitation. Given the above disclosure, one skilled in the art could devise variations that are within the scope and spirit of the various concepts disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for identifying an appropriately sized article of footwear, comprising:
 a 3-dimensional (3D) scanner configured to scan at least one foot of a user and generate a 3D model of the at least one foot of the user;
 a computer in communication with the 3D scanner, the computer including a processor and a memory, the memory storing computer instructions configured to instruct the processor to:
  analyze the 3D model of the at least one foot of the user to determine an exterior shape of the at least one foot of the user and a first volume of the at least one foot of the user;
  receive an internal shape of an interior space of at least one article of footwear of a plurality of articles of footwear and a second volume of the interior space of the at least one article of footwear of the plurality of articles of footwear;
  compare the exterior shape of the at least one foot of the user and the first volume of the at least one foot of the user with the internal shape of the interior space of the at least one article of footwear and the second volume of the interior space of the at least one article of footwear;
  determine a degree of size match between the at least one foot of the user and the at least one article of footwear of the plurality of articles of footwear based on the comparison of the exterior shape of the at least one foot of the user and the first volume of the at least one foot of the user with the internal shape of the interior space of the at least one article of footwear and the second volume of the interior space of the at least one article of footwear;
  identify a particular article of footwear of the plurality of articles of footwear having a greatest degree of size match with the at least one foot of the user, wherein the particular article of footwear defines a particular footwear size; and recommend the particular article of footwear defining the particular footwear size to the user;

a contour fitting sock configured to be worn on the at least one foot of the user, wherein the contour fitting sock includes:

at least one set of reference marks, wherein the marks of the at least one set of reference marks are configured to stay equally spaced apart from each other when the contour fitting sock is in a first arrangement in which the contour fitting sock is separated from the at least one foot of the user and when the contour fitting sock is in a second arrangement in which the contour fitting sock is worn on the at least one foot of the user; and a plurality of measurement marks arranged about the contour fitting sock, wherein the measurement marks of the plurality of measurement marks are configured to move apart from each other as the contour fitting sock stretches when the contour fitting sock is worn on the at least one foot of the user, wherein the 3D scanner is configured to generate the 3D model of the at least one foot of the user by scanning the at least one set of reference marks and the plurality of measurement marks.

2. The system of claim 1, wherein the 3D scanner includes a light detection and ranging (LIDAR) scanner.

3. The system of claim 1, wherein the 3D scanner includes at least one scanner included in smartphone or a tablet computer.

4. The system of claim 3, wherein the at least one scanner includes at least one camera included in the smartphone or tablet computer.

5. The system of claim 1, wherein the computer instructions are further configured to instruct the processor to recommend a particular style of footwear and a corresponding size of the particular style of footwear based on the degree of size match between the at least one foot of the user and the at least one article of footwear of the plurality of articles of footwear.

6. A system for identifying an appropriately sized article of footwear, comprising:

a 3-dimensional (3D) scanner configured to scan at least one foot of a user and generate a 3D model of the at least one foot of the user;

a computer in communication with the 3D scanner, the computer including a processor and a memory, the memory storing computer instructions configured to instruct the processor to:

analyze the 3D model of the at least one foot of the user to determine an exterior shape of the at least one foot of the user and a first volume of the at least one foot of the user;

receive an internal shape of an interior space of at least one article of footwear of a plurality of articles of footwear and a second volume of the interior space of the at least one article of footwear of the plurality of articles of footwear;

compare the exterior shape of the at least one foot of the user and the first volume of the at least one foot of the user with the internal shape of the interior space of the at least one article of footwear and the second volume of the interior space of the at least one article of footwear;

determine a degree of size match between the at least one foot of the user and the at least one article of footwear of the plurality of articles of footwear based on the comparison of the exterior shape of the at least one foot of the user and the first volume of the at least one foot of the user with the internal shape of the interior space of the at least one article of footwear and the second volume of the interior space of the at least one article of footwear;

identify a particular article of footwear of the plurality of articles of footwear having a greatest degree of size match with the at least one foot of the user, wherein the particular article of footwear defines a particular footwear size; and recommend the particular article of footwear defining the particular footwear size to the user;

wherein the computer instructions are further configured to instruct the processor to:

identify a transverse cross-section across a midline of an ankle of the at least one foot of the user in the 3D model of the at least one foot of the user; and determine the first volume of the at least one foot of the user within a 3D space extending from the transverse cross-section to a distal end of the at least one foot of the user.

7. The system of claim 6, wherein the computer instructions are further configured to instruct the processor to:

identify a third volume within the first volume of the at least one foot of the user, wherein the third volume corresponds with a predetermined region of the at least one foot of the user;

receive a fourth volume within the second volume of the interior space of the at least one article of footwear of the plurality of articles of footwear, wherein the fourth volume is in a region of the interior space of the at least one article of footwear corresponding with the predetermined region of the at least one foot of the user; and compare the third volume with the fourth volume to determine a degree of volume match between third volume and the fourth volume.

8. The system of claim 7, wherein the predetermined region of the at least one foot of the user includes a heel of the at least one foot of the user, an arch of the at least one foot of the user, a lateral longitudinal arch of the at least one foot of the user, a medial longitudinal arch of the at least one foot of the user, a base of a little toe of the at least one foot of the user, a base of a big toe of the at least one foot of the user, a lateral side of the little toe of the at least one foot of the user, a lateral side of the big toe of the at least one foot of the user, an upper surface adjacent the lateral side of the little toe of the at least one foot of the user, and upper surface adjacent the big toe of the at least one foot of the user, a transverse arch of the at least one foot of the user, or an upper portion of the at least one foot of the user.

9. A system for identifying an appropriately sized article of clothing, comprising:

a 3-dimensional (3D) scanner configured to scan an anatomical region of a user and generate a 3D model of the anatomical region of the user;

a computer in communication with the 3D scanner, the computer including a processor and a memory, the memory storing computer instructions configured to instruct the processor to:

analyze the 3D model of the anatomical region of the user to determine an exterior shape of the anatomical region of the user and a first volume of the anatomical region of the user;

receive an internal shape of an interior space of at least one article of clothing of a plurality of articles of clothing and a second volume of the interior space of the at least one article of clothing of the plurality of articles of clothing, wherein the articles of clothing of the plurality of articles of clothing are configured to fit the anatomical region of the user;

compare the exterior shape of the anatomical region of the user and the first volume of the anatomical region of the user with the internal shape of the interior space of the at least one article of clothing and the second volume of the interior space of the at least one article of clothing;

determine a degree of size match between the anatomical region of the user and the at least one article of clothing of the plurality of articles of clothing based on the comparison of the exterior shape of the anatomical region of the user and the first volume of the anatomical region of the user with the internal shape of the interior space of the at least one article of clothing and the second volume of the interior space of the at least one article of clothing;

identify a particular article of clothing of the plurality of articles of clothing having a greatest degree of size match with the anatomical region of the user, wherein the particular article of clothing defines a particular clothing size; and recommend the particular article of clothing defining the particular clothing size to the user;

a contour fitting garment configured to be worn on the anatomical region of the user, wherein the contour fitting garment includes:

at least one set of reference marks, wherein the marks of the at least one set of reference marks are configured to stay equally spaced apart from each other when the contour fitting garment is in a first arrangement in which the contour fitting garment is separated from the anatomical region of the user and when the contour fitting garment is in a second arrangement in which the contour fitting garment is worn on the anatomical region of the user; and a plurality of measurement marks arranged about the contour fitting garment, wherein the measurement marks of the plurality of measurement marks are configured to move apart from each other as the contour fitting garment stretches when the contour fitting garment is worn on the anatomical region of the user, wherein the 3D scanner is configured to generate the 3D model of the anatomical region of the user by scanning the at least one set of reference marks and the plurality of measurement marks.

10. The system of claim 9, wherein the 3D scanner includes a light detection and ranging (LIDAR) scanner.

11. The system of claim 9, wherein the 3D scanner includes at least one scanner included in a smartphone or a tablet computer.

12. The system of claim 9, wherein the at least one scanner includes at least one camera included in a smartphone or tablet computer.

13. The system of claim 9, wherein the computer instructions are further configured to instruct the processor to recommend a particular style of clothing and a corresponding size of the particular style of clothing based on the degree of size match between the anatomical region of the user and the at least one article of clothing of the plurality of articles of clothing.

14. A system for identifying an appropriately sized article of clothing, comprising:

a 3-dimensional (3D) scanner configured to scan an anatomical region of a user and generate a 3D model of the anatomical region of the user;

a computer in communication with the 3D scanner, the computer including a processor and a memory, the memory storing computer instructions configured to instruct the processor to:

analyze the 3D model of the anatomical region of the user to determine an exterior shape of the anatomical region of the user and a first volume of the anatomical region of the user;

receive an internal shape of an interior space of at least one article of clothing of a plurality of articles of clothing and a second volume of the interior space of the at least one article of clothing of the plurality of articles of clothing, wherein the articles of clothing of the plurality of articles of clothing are configured to fit the anatomical region of the user;

compare the exterior shape of the anatomical region of the user and the first volume of the anatomical region of the user with the internal shape of the interior space of the at least one article of clothing and the second volume of the interior space of the at least one article of clothing;

determine a degree of size match between the anatomical region of the user and the at least one article of clothing of the plurality of articles of clothing based on the comparison of the exterior shape of the anatomical region of the user and the first volume of the anatomical region of the user with the internal shape of the interior space of the at least one article of clothing and the second volume of the interior space of the at least one article of clothing;

identify a particular article of clothing of the plurality of articles of clothing having a greatest degree of size match with the anatomical region of the user, wherein the particular article of clothing defines a particular clothing size; and recommend the particular article of clothing defining the particular clothing size to the user;

wherein the computer instructions are further configured to instruct the processor to:

identify a third volume within the first volume of the anatomical region of the user, wherein the third volume corresponds with a predetermined region of the anatomical region of the user;

receive a fourth volume within the second volume of the interior space of the at least one article of clothing of the plurality of articles of clothing, wherein the fourth volume is in a region of the interior space of the at least one article of clothing corresponding with the predetermined region of the anatomical region of the user; and compare the third volume with the fourth volume to determine a degree of volume match between third volume and the fourth volume.

15. A computer-implemented method of identifying an appropriately sized article of footwear, comprising:

receiving a 3-dimensional (3D) model of at least one foot of a user;

analyzing the 3D model of the at least one foot of the user to determine an exterior shape of the at least one foot of the user and a first volume of the at least one foot of the user;

receiving an internal shape of an interior space of at least one article of footwear of a plurality of articles of footwear and a second volume of the interior space of the at least one article of footwear of the plurality of articles of footwear;

comparing the exterior shape of the at least one foot of the user and the first volume of the at least one foot of the user with the internal shape of the interior space of the at least one article of footwear and the second volume of the interior space of the at least one article of footwear;

determining a degree of size match between the at least one foot of the user and the at least one article of footwear of the plurality of articles of footwear based on the comparison of the exterior shape of the at least one foot of the user and the first volume of the at least one foot of the user with the internal shape of the interior space of the at least one article of footwear and the second volume of the interior space of the at least one article of footwear;

identifying a particular article of footwear of the plurality of articles of footwear having a greatest degree of size match with the at least one foot of the user, wherein the particular article of footwear defines a particular footwear size; and recommending the particular article of footwear defining the particular footwear size to the user;

scanning the at least one foot of the user to generate the 3D model of the user's foot, wherein scanning the at least one foot of the user includes:

scanning at least one set of reference marks of a contour fitting sock worn on the at least one foot of the user, wherein the marks of the at least one set of reference marks are configured to stay equally spaced apart from each other when the contour fitting sock is in a first arrangement in which the contour fitting sock is separated from the at least one foot of the user and when the contour fitting sock is in a second arrangement in which the contour fitting sock is worn on the at least one foot of the user;

scanning a plurality of measurement marks of the contour fitting sock, wherein the measurement marks of the plurality of measurement marks are configured to move apart from each other as the contour fitting sock stretches when the contour fitting sock is worn on the at least one foot of the user; and generating the 3D model of the at least one foot of the user based on the scanned reference marks and the scanned measurement marks.

16. The computer-implemented method of claim 15, wherein the at least one foot of the user is scanned by a light detection and ranging (LIDAR) scanner.

17. The computer-implemented method of claim 15, wherein the at least one foot of the user is scanned by at least one scanner included in smartphone or a tablet computer.

* * * * *